United States Patent
Norwich

(10) Patent No.: US 11,788,613 B2
(45) Date of Patent: Oct. 17, 2023

(54) TORQUE CONVERTER THRUST WASHER AND SEAL PLATE ASSEMBLY

(71) Applicant: Schaeffler Technologies AG & Co. KG, Herzogenaurach (DE)

(72) Inventor: Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/870,929

(22) Filed: Jul. 22, 2022

(65) Prior Publication Data

US 2023/0060704 A1 Mar. 2, 2023

Related U.S. Application Data

(60) Provisional application No. 63/240,352, filed on Sep. 2, 2021.

(51) Int. Cl.
*F16H 41/28* (2006.01)
*F16H 41/24* (2006.01)

(52) U.S. Cl.
CPC ....... *F16H 41/28* (2013.01); *F16H 2041/243* (2013.01)

(58) Field of Classification Search
CPC .............. F16H 45/02–2045/0294; F16H 41/28
See application file for complete search history.

(56) References Cited

U.S. PATENT DOCUMENTS

| | | | |
|---|---|---|---|
| 9,309,956 B2* | 4/2016 | Lindemann | F16H 45/02 |
| 2004/0112698 A1* | 6/2004 | Maienschein | F16H 45/02 |
| | | | 192/3.23 |
| 2017/0314661 A1* | 11/2017 | Lindemann | F16H 41/28 |

FOREIGN PATENT DOCUMENTS

| | | | |
|---|---|---|---|
| DE | 102020101143 A1 * | 7/2021 | |
| KR | 20150071816 A * | 6/2015 | |

OTHER PUBLICATIONS

Maienshein, Machine Translation DE-102020101143, Jul. 2021 (Year: 2021).*
Park, Machine Translation, KR-20150071816, Jun. 2015 (Year: 2015).*

* cited by examiner

*Primary Examiner* — Topaz L. Elliott
*Assistant Examiner* — Michael K. Reitz

(57) ABSTRACT

A torque converter includes a front cover arranged to receive a torque and a damper assembly including an output flange arranged to non-rotatably connect to a transmission input shaft. The torque converter further includes a seal plate disposed between the front cover and the output flange. The seal plate is non-rotatably connected to the cover. The torque converter further includes a thrust washer including a body axially disposed between the seal plate and the output flange. The thrust washer is fixed to the seal plate.

19 Claims, 2 Drawing Sheets

TORQUE CONVERTER THRUST WASHER AND SEAL PLATE ASSEMBLY

CROSS-REFERENCE TO RELATED APPLICATIONS

This application claims the benefit of U.S. Provisional Patent Application No. 63/240,352, filed Sep. 2, 2021, the disclosure of which is incorporated in its entirety by reference herein.

TECHNICAL FIELD

The present disclosure relates to a torque converter for a vehicle. In particular, the present disclosure relates to a thrust washer and seal plate assembly for a torque converter.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. Due to limited spacing within a torque converter envelope, it is desirable to have alternative designs and configurations to fit all the necessary components within the torque converter while still meeting durability and performance requirements.

SUMMARY

In one embodiment, a torque converter includes a front cover arranged to receive a torque and a damper assembly including an output flange arranged to non-rotatably connect to a transmission input shaft. The torque converter further includes a seal plate disposed between the cover and the output flange. The seal plate is non-rotatably connected to the front cover. The torque converter further includes a thrust washer having a body axially disposed between the seal plate and the output flange. The thrust washer is fixed to the seal plate.

In embodiments, the output flange may be configured to rotate relative to the thrust washer. In embodiments, the thrust washer may include a post extending axially from the body, and the seal plate may include an opening extending axially therethrough. The post may be received in the opening. The front cover may include a groove axially aligned with the opening. The post may extend through the opening into the groove. The seal plate may be fixed to the front cover via a weld having two portions radially spaced from each other. The opening may be disposed radially between the two portions of the weld. The weld may extend entirely about the opening. The thrust washer may be disposed radially between the two portions of the weld.

In embodiments, the seal plate may be fixed to the front cover via a weld having two portions radially spaced from each other. The thrust washer may be disposed radially between the two portions of the weld. The weld may extend entirely about the thrust washer.

In embodiments, the body of the thrust washer may abut the seal plate. In embodiments, the damper assembly may include a cover plate disposed axially between the output flange and the seal plate. The thrust washer may be disposed radially inside of the cover plate.

In embodiments, the output flange may include a hole extending axially therethrough. The thrust washer may be disposed radially inside of the hole. The damper assembly may include a spring supported by the output flange. The hole may be disposed radially inside of the spring. The damper assembly may include a cover plate disposed axially between the output flange and the seal plate. The cover plate may extend radially across a portion of the hole. The thrust washer may be disposed radially inside of the hole and the cover plate. The torque converter may further include an impeller having an impeller shell non-rotatably connected to the front cover. The torque converter may further include a turbine in fluid communication with the impeller and including a turbine shell. The damper assembly may include a cover plate connected to the output flange and the turbine shell via a connector. The connector may be radially aligned with the hole. The output flange may be disposed axially between the connector and the thrust washer. The output flange may be disposed axially between the seal plate and the turbine. The seal plate may be fixed to the front cover via a weld having two portions radially spaced from each other. One of the portions may extend radially across a portion of the hole.

Embodiments according to the present disclosure provides a thrust washer and seal plate assembly configured for envelopes with axial constraints that also meets performance and durability requirements.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
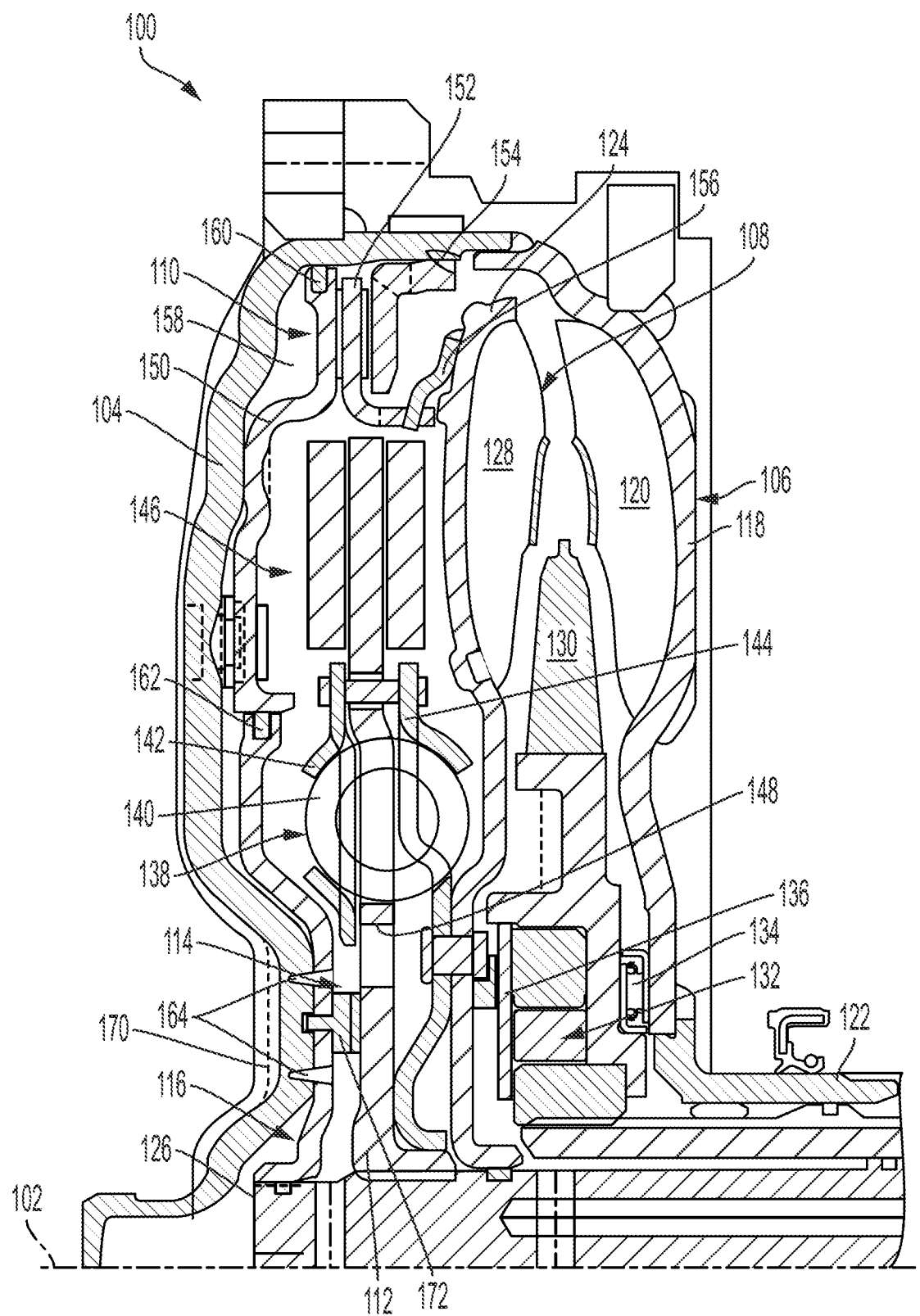
FIG. 1 is a cross-sectional view of a torque converter having a thrust washer and seal plate assembly according to an embodiment of the present disclosure.
Figure 2:
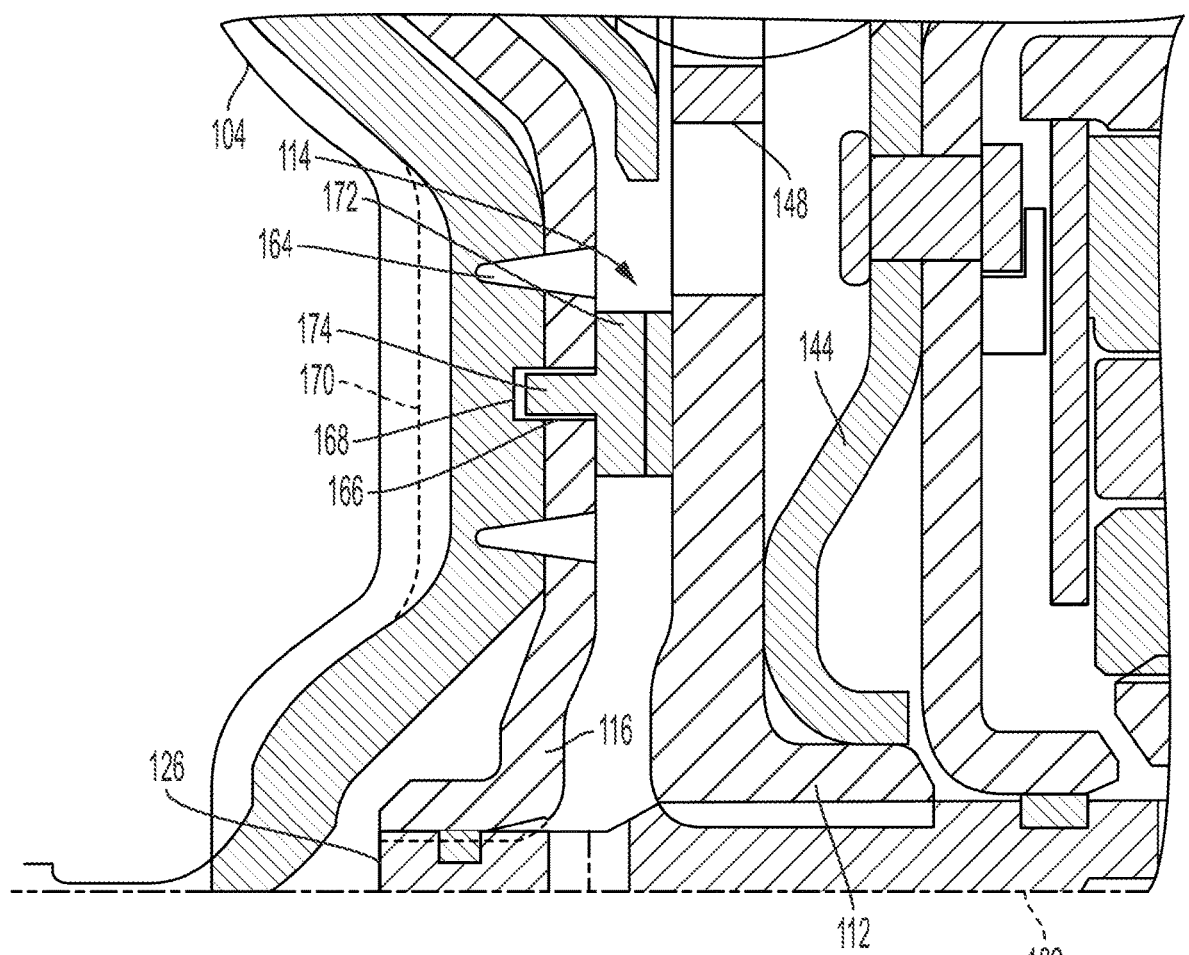
FIG. 2 is an enlarged view of an area of the torque converter of FIG. 1.

Referring to FIGS. 1-2, a portion of torque converter 100 is illustrated according to one embodiment of the present disclosure. At least some portions of torque converter 100 are rotatable about central axis 102. While only a portion of torque converter 100 above central axis 102 is shown in FIG. 1, it should be understood that torque converter 100 can appear substantially similar below central axis 102 with many components extending about central axis 102. Words such as "axial," "radial," "circumferential," "outward," etc. as used herein are intended to be with respect to central axis 102.

Torque converter 100 includes: front cover 104 arranged to receive torque; impeller 106; turbine 108; output flange 112; thrust washer 114; and seal plate 116 non-rotatably connected to front cover 104. Impeller 106 includes: impeller shell 118 non-rotatably connected to front cover 104 such that impeller 106 rotates as front cover 104 rotates, at least one impeller blade 120 attached to an inner surface of the impeller shell 118, and impeller hub 122 attached to a radially inner end of impeller shell 118. Turbine 108 includes turbine shell 124 non-rotatably connected to transmission input shaft 126 and at least one turbine blade 128 attached to the turbine shell 124. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Torque converter 100 may include: stator 130 disposed axially between impeller 106 and turbine 108 to redirect fluid flowing from turbine blade 128 before the fluid reaches impeller 106 to increase an efficiency of torque converter 100. For example, impeller blade 120, when rotated about central axis 102, pushes the fluid outwardly. The fluid pushes against turbine 108 of torque converter 100, causing turbine 108 to revolve about central axis 102. Stator 130 functions to return the fluid from turbine 108 back to impeller 106 with minimal or no power loss. Drive power is transmitted from turbine 108 to transmission input shaft 126. Torque converter 100 may, for example, further include: one-way clutch 132 disposed within stator 130, thrust bearing 134 disposed axially between stator 130 and impeller shell 118, and side plate 136 configured to retain the one-way clutch 132 within the stator 130.

Torque converter 100 also includes damper assembly 138 for hydraulically transferring torque through torque converter 100. Damper assembly 138 is positioned axially between front cover 104 and turbine 108 and is configured to transfer torque from front cover 104 to transmission input shaft 126. Damper assembly 138 includes: springs 140; cover plates 142, 144; and output flange 112. Cover plate 142 may support springs 140 on one axial side. Cover plate 144 may support springs 140 on another, opposite axial side. Cover plates 142, 144 may be connected to each other and output flange 112, for example, via a rivet, radially outside of springs 140. Cover plate 144 may further be connected to turbine shell 124, for example, by a rivet. Torque converter 100 may include centrifugal pendulum absorber 146 connected to output flange 112.

Output flange 112 is connected to transmission input shaft 126 for torque transmission therebetween. Output flange 112 includes hole 148 extending axially through output flange 112. Hole 148 is configured to permit a tool, e.g., a rivet tool, to connect cover plate 144 to turbine shell 124. Cover plate 142 may extend radially across a portion of hole 148.

Power from a vehicle engine (not shown) can be transmitted to a transmission (not shown) via fluid, and via torque converter 100. In particular, the power may first be transmitted to front cover 104 of torque converter 100. Torque converter 100 may include lock-up clutch 110 configured to selectively transfer torque from front cover 104 to transmission input shaft 126. Lock-up clutch 110 includes piston 150, clutch plate 152, and reaction plate 154.

Piston 150 may be connected to front cover 104 via a leaf-spring connection and sealed to front cover 104 at an outer diameter thereof. Reaction plate 154 may be fixed to front cover 104 via a weld, for example. Clutch plate 152 may be disposed between piston 150 and reaction plate 154. Clutch plate 152 may further be connected to drive ring 156, for example, via a tabbed connection. Drive ring 156 may be fixed to turbine shell 124 at one end and attached to clutch plate 152 on an opposite end.

Piston 150 engages or closes lock-up clutch 110 in response to the pressurization of a medium (e.g., fluid such as oil) in piston apply chamber 158 defined between front cover 104 and piston 150. During axial movement of piston 150, piston 150 slides along seal plate 116. Piston 150 is sealed at an outer diameter to front cover 104 via seal 160 and sealed at an inner diameter to seal plate 116 via seal 162. Seals 160, 162 maintain a fluid separation between piston apply chamber 158 and the rest of torque converter 100. Piston apply chamber 158 is further defined by, or bounded between, front cover 104, seal 160, piston 150, seal 162, and seal plate 116. By "bounded in part," we mean that a portion of the cited chamber, flow path, or other structure is bounded, or formed, by the cited element.

Seal plate 116 is non-rotatably connected to front cover 104, e.g., via welds 164, and sealed to transmission input shaft 126 at an inner diameter thereof. Each weld 164 is one, continuous weld. Each weld 164 may, for example, have two portions radially spaced from each other. Welds 164 may be circumferentially spaced from each other about central axis 102.

Referring to FIG. 2, seal plate 116 further includes openings 166 extending axially therethrough. Openings 166 are arranged in a dry area where fluid leakage is not permissible, e.g., between portions of respective welds 164. For example, each weld 164 may extend entirely about one respective opening 166. In such an example, welds 164 may be generally circular, i.e., extend entirely around corresponding openings 166 even if welds 164 deviates from a perfect circle. Front cover 104 includes grooves 168 on an axial side facing seal plate 116. Openings 166 are axially and radially aligned with grooves 168.

Seal plate 116 and/or front cover 104 may further include channels 170. Channels 170 may be formed on an axial side of seal plate 116 facing front cover 104 and/or on an axial side of front cover 104 facing seal plate 116. channels 170 may be circumferentially spaced from openings 166 and grooves 168. Channels 170 are provided to allow fluid flow between seal plate 116 and front cover 104, e.g., from the transmission input shaft 126 to the piston apply chamber 158. That is, pressurized fluid may be supplied from transmission input shaft 126 and then routed between seal plate 116 and front cover 104 via channels 170 to piston apply chamber 158.

Thrust washer 114 includes body 172 and posts 174. Body 172 is disposed between seal plate 116 and output flange 112. Specifically, body 172 abuts an axial side of seal plate 116. Posts 174 extend axially outward toward front cover 104 from body 172. Posts 174 are configured to be received and retained within corresponding openings 166 and grooves 168. That is, posts 174 extend through corresponding openings 166 and into corresponding grooves 168. Posts 174 fix thrust washer 114 to seal plate 116 such that relative motion between seal plate 116 and thrust washer 114 is prevented. Fixing thrust washer 114 to seal plate 116 generates relative motion between thrust washer 114, e.g., a hydrodynamic surface thereof, and output flange 112 instead. Welding seal plate 116 to front cover 104 may create deformations on the axial side of seal plate 116 abutting thrust washer 114. Fixing thrust washer 114 to seal plate 116 and creating relative motion between thrust washer 114 and output flange 112, which may lack surface deformations on an axial side facing thrust washer 114, can reduce wearing of thrust washer 114 during operation of torque converter 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Torque converter
102 Central axis
104 Front Cover
106 Impeller
108 Turbine
110 Lock-up clutch
112 Output flange
114 Thrust washer
116 Seal plate
118 Impeller shell
120 Impeller blade
122 Impeller hub
124 Turbine shell
126 Transmission input shaft
128 Turbine blade
130 Stator
132 One-way clutch
134 Thrust bearing
136 Side plate
138 Damper assembly
140 Springs
142 Cover plate
144 Cover plate
146 Centrifugal pendulum absorber
148 Hole
150 Piston
152 Clutch plate
154 Reaction plate
156 Drive ring
158 Piston apply chamber
160 Seal
162 Seal
164 Weld portion
166 Opening
168 Groove
170 Channel
172 Body
174 Post

What is claimed is:

1. A torque converter comprising:
a front cover configured to receive a torque;
a damper assembly including an output flange arranged to non-rotatably connect to a transmission input shaft;
a seal plate disposed between the front cover and the output flange, the seal plate being non-rotatably connected to the front cover; and
a thrust washer including a body axially disposed between the seal plate and the output flange, the thrust washer being fixed to the seal plate;
wherein the thrust washer includes a post extending axially from the body, and the seal plate includes an opening extending axially therethrough, the post being received in the opening;
wherein the front cover includes a groove axially aligned with the opening, the post extending through the opening into the groove.

2. The torque converter of claim 1, wherein the output flange is configured to rotate relative to the thrust washer.

3. The torque converter of claim 1, wherein the seal plate is fixed to the front cover via a weld having two portions radially spaced from each other, the opening being disposed radially between the two portions of the weld.

4. The torque converter of claim 3, wherein the weld extends entirely about the opening.

5. The torque converter of claim 3, wherein the thrust washer is disposed radially between the two portions of the weld.

6. The torque converter of claim 1, wherein the seal plate is fixed to the front cover via a weld having two portions radially spaced from each other, the thrust washer being disposed radially between the two portions of the weld.

7. The torque converter of claim 6, wherein the weld extends circumferentially about the thrust washer.

8. The torque converter of claim 1, wherein the body of the thrust washer abuts the seal plate.

9. The torque converter of claim 1, further comprising a central axis of rotation, wherein the damper assembly includes a cover plate disposed axially between the output flange and the seal plate, the thrust washer being disposed radially inward of the cover plate.

10. The torque converter of claim 1, further comprising a central axis of rotation, wherein the output flange includes a hole extending axially therethrough, the thrust washer being disposed radially inward of the hole.

11. The torque converter of claim 10, wherein the damper assembly includes a spring supported by the output flange, the hole being disposed radially inward of the spring.

12. The torque converter of claim 10, wherein the damper assembly includes a cover plate disposed axially between the output flange and the seal plate, the cover plate extending radially across a portion of the hole.

13. The torque converter of claim 12, wherein the thrust washer is disposed radially inward of the hole and the cover plate.

14. The torque converter of claim 10, further comprising:
an impeller having an impeller shell non-rotatably connected to the front cover; and
a turbine in fluid communication with the impeller and including a turbine shell;

wherein the damper assembly includes a cover plate connected to the output flange and the turbine shell via a connector;

wherein the connector is radially aligned with the hole.

15. The torque converter of claim 14, wherein the output flange is disposed axially between the connector and the thrust washer.

16. The torque converter of claim 14, wherein the output flange is disposed axially between the seal plate and the turbine.

17. The torque converter of claim 10, wherein the seal plate is fixed to the front cover via a weld having two portions radially spaced from each other, one of the portions extending radially across a portion of the hole.

18. A torque converter comprising:
a front cover configured to receive a torque;
a damper assembly including an output flange arranged to non-rotatably connect to a transmission input shaft;
a seal plate disposed between the front cover and the output flange, the seal plate being non-rotatably connected to the front cover; and
a thrust washer including a body axially disposed between the seal plate and the output flange, the thrust washer being fixed to the seal plate;
wherein the seal plate is fixed to the front cover via a weld having two portions radially spaced from each other, the thrust washer being disposed radially between the two portions of the weld.

19. A torque converter comprising:
a front cover configured to receive a torque;
a damper assembly including an output flange arranged to non-rotatably connect to a transmission input shaft;
a seal plate disposed between the front cover and the output flange, the seal plate being non-rotatably connected to the front cover; and
a thrust washer including a body axially disposed between the seal plate and the output flange, the thrust washer being fixed to the seal plate;
wherein the thrust washer includes a post extending axially from the body, and the seal plate includes an opening extending axially therethrough, the post being received in the opening;
wherein the seal plate is fixed to the front cover via a weld having two portions radially spaced from each other, the opening being disposed radially between the two portions of the weld.

* * * * *